: 2,979,532
Patented Apr. 11, 1961

2,979,532

PREPARATION OF DIALKYL DISULFIDES

Warren S. MacGregor, Camas, Wash., assignor to Crown Zellerbach Corporation, San Francisco, Calif., a corporation of Nevada No Drawing. Filed Feb. 9, 1959, Ser. No. 791,836

20 Claims. (Cl. 260—608)

This invention relates to a process for the preparation of dialkyl disulfides. More particularly, this invention relates to a process for the preparation of lower dialkyl disulfides by reacting a lower alkyl mercaptan having from 1 to 3 carbon atoms with an oxidizing gas in the presence of a special catalyst, whereby the mercaptan is converted to the corresponding disulfide and the disulfide formed is separated from the reaction mixture.

While it has long been known that mercaptans could be reacted with an oxygen-containing gas to produce corresponding disulfides, employing various types of catalysts, the low product yields heretofore obtainable have made the reaction impractical on industrial scale. The oxidation of high molecular weight mercaptans to the corresponding disulfides in the presence of a catalyst comprising cupric chloride adsorbed on an inert support such as clay or fuller's earth has been described by Smith in U.S. Patent No. 2,501,792. Turner (U.S. Patent No. 2,028,303) has described vapor phase oxidation of ethyl mercaptan to ethyl disulfide using oxidizing gas mixtures in the presence of a catalyst consisting of a steel wool coated with iron oxide, copper oxide or other metallic oxides, as well as in the presence of activated charcoal. Mertz et al. (U.S. Patent No. 2,558,221) is concerned with the oxidation of tertiary-alkyl mercaptans to the corresponding disulfides with oxygen using activated bauxite as a catalyst. In U.S. Patent No. 2,574,884, the latter-mentioned patentees describe the same process using certain alumina-base catalysts, particularly chromia, vanadia and magnetic iron oxide each associated with alumina. Haimsohn et al. (U.S. Patent No. 2,859,249) have disclosed oxidation of lower alkyl mercaptans to the corresponding disulfides with a gas containing oxygen in the presence of fluidized catalysts, such as activated bauxite, activated charcoal, nickel oxide, iron oxide, copper oxide and cobalt oxide. The above mentioned prior art catalysts are however deficient in promoting effectively the oxidation of mercaptans to the corresponding disulfides particularly from a chemical standpoint. Because of the poor selectivity of such catalysts, substantial amounts of undesirable side products are formed during the reaction. These side products adversely affect the yield of the desired disulfide since a portion of the mercaptan is converted to the side products. Furthermore, such catalysts having a low activity require relatively high operating temperatures for conversion of mercaptans to disulfides.

It is the general object of the present invention to provide a process for the prepartion of lower dialkyl disulfides, particularly dimethyl disulfide, in substantial yields from corresponding lower alkyl mercaptans in the presence of a special, highly selective catalyst.

It is another important object of this invention to provide an economical and commercially attractive process for the manufacture of dimethyl disulfide in the presence of a highly active catalyst, whereby a substantially complete conversion of the methyl mercaptan to the disulfide is achieved.

Other objects of the present invention will be apparent to those skilled in the art from the following disclosure.

In accordance with this invention, dialkyl disulfides may be prepared efficiently and in high yields by reacting a lower alkyl mercaptan having from 1 to 3 carbon atoms with an oxygen-containing gas in the presence of a novel, highly selective catalyst for such reaction. I have discovered that such highly suitable catalyst is an activated carbon catalyst containing copper oxide or iron oxide. The reaction according to this invention is carried out for a period of time sufficient to effect a substantially complete conversion of the mercaptan to the corresponding disulfide. Thereafter the disulfide product is recovered from the reaction mixture.

It should therefore be emphasized that whereas the prior art processes employ numerous catalysts for the oxidation of mercaptans to disulfides, the special catalyst described herein is characterized by superior selectivity for promoting the oxidation reaction and by remarkable activity which reduces considerably or eliminates side reactions and thus increases the yield of the desired end product, i.e. dialkyl disulfide, at a given reaction temperature. Moreover, the catatlyst according to this invention has a longer life than those of the prior art; it may be employed in smaller amounts of obtain a substantially complete conversion of the mercaptan to the disulfide at a given flow rate; it increases the reaction rate at a given temperature; and permits carrying out of the reaction at a markedly lower temperature.

Although the process of this invention is described in terms of the conversion of methyl mercaptan to dimethyl disulfide, it will be understood that the present process is also applicable to the oxidation of lower alkyl mercaptans having up to 3 carbon atoms inclusive. Thus, methyl, ethyl, propyl mercaptans and mixtures thereof are suitable starting materials. When mixtures of mercaptans are employed, symmetrical and unsymmetrical disulfides will be produced. These may include methyl-ethyl, methyl-propyl and ethyl-propyl disulfides.

The principal reactant in the process, i.e. methyl mercaptan is readily available at low cost from petroleum industry, as well as from spent liquors derived from pulping lignocellulose materials (see U.S. Patent No. 2,840,614).

The oxygen-containing gas suitable for use in the present process is an oxidizing gas containing free oxygen, such as oxygen or air.

The catalyst in accordance with the present invention consists essentially of activated carbon and an oxide of a metal selected from the group consisting of copper and iron, the oxide being intimately assoicated with the carbon. Such catalyst may be prepared by treating activated carbon with an aqueous solution of an iron or copper salt and then precipitating the hydroxide by adding an aqueous alkali metal hydroxide solution such as sodium hydroxide, potassium hydroxide, etc. Examples of suitable metal salts are copper sulfate, copper chloride, copper nitrate, copper acetate, and the like. Similar iron salts are equally satisfactory. The metallic precipitation of the hydroxide on the carbon may be carried out at room temperature, although any temperature between the freezing and boiling points of the solution is satisfactory. The precipitated metallic hydroxide forms a deposit on the surface of the activated carbon, which deposit adheres strongly to the carbon. The resulting catalyst may be rinsed with water and then is dried at about 100° C. for a time sufficient to evaporate the water and to convert the metallic hydroxide to the oxide.

A catalyst of this invention may be also prepared by impregnating the activated carbon with a solution of a thermally unstable salt, such as copper or iron nitrate and then evaporating the water and heating the impregnated activated carbon until the metal oxide is produced.

The finished catalyst contains a major proportion of activated carbon and a minor proportion of the oxide. In general, up to about 20% by weight of the oxide, and preferably between 0.1% and 5%, based on the weight of activated carbon will given a highly satisfactory catalyst for the process of this invention.

As is well known, activated carbon may be derived from walnut shells, lignite, coconut shells, bone, and the like materials. Such carbons are commercially available in varying particle sizes. I have found that the preferred particle size for the catalyst to be used in a fluidized bed is in the approximate range of 50 to 250 mesh. For a fixed bed, a particle size from about 4 to 40 mesh is highly satisfactory.

The effectiveness of the novel catalyst of this invention may be improved by incorporating therein, as an optional ingredient, a small amount of a promoter consisting essentially of a monohydric phenol, such as phenol itself, cresols, xylenols and the like. Such compounds may have their aryl group either substituted or unsubstituted. I have found that cresols are highly efficient promoters for the catalyst of this invention. Although the amount of the promoter to be incorporated is not very critical, up to 5%, preferably from 0.1% to 2% by weight based on the weight of the activated carbon is generally sufficient.

In accordance with the present invention, the lower alkyl mercaptans may be oxidized to the corresponding disulfides either in the liquid or in the vapor phase. When the process is effectuated in the liquid phase, the mercaptan is employed in the form of an aqueous alkaline solution, for example a solution of sodium or potassium hydroxide.

In either event, i.e. whether the reaction is carried out in the liquid or vapor phase, the mercaptan and the oxidizing gas are fed into a suitable reaction vessel provided with means for heating and containing the catalyst. The reaction mixture is heated at a temperature between about 90° C. and the boiling point of the reaction mixture (about 100° C.) when the reaction is carried out in the liquid phase. In the case of the vapor phase procedure, the temperature in the reaction zone is above the boiling point of the mixture of the reaction products but below about 250° C. The preferred temperature range for the vapor phase reaction is between about 150° C. and 220° C. The oxidation reaction is carried out at substantially atmospheric pressure under the above stipulated conditions for a period of time sufficient to effect a substantially complete conversion of the mercaptan to the corresponding disulfide. If desired, the reaction may be carried out under a pressure of up to about 100 p.s.i., or even higher.

The respective amounts of the mercaptan and oxygen fed into the reaction zone are preferably approximately stoichiometric in accordance with the reaction:

$$4CH_3SH + O_2 \rightarrow 2CH_3SSCH_3 + 2H_2O$$

However, a larger oxygen/mercaptan molar ratio may be employed.

The dimethyl disulfide product is withdrawn from the reaction zone, condensed, and separated from the aqueous layer produced concurrently through condensation of water vapor.

The following examples are given to define and to illustrate the present invention, but in no way to limit the reagents, proportions or conditions described therein. Obvious modifications will occur to any persons skilled in the art.

EXAMPLE 1

A gas mixture containing methyl mercaptan and oxygen was introduced in approximately stoichiometric amounts into a vertical reactor fitted with a jacket containing glycerine for controlling the temperature of the reaction. The flow rate of the mercaptan was 3.6 grams per minute. The reactor consisted of a stainless steel tube having an inside diameter of 1 inch and being 20 inches high. A separate steam-jacketed pot was employed to preheat glycerine to the desired temperature; a small centrifugal pump fed the hot glycerin through the reactor jacket. A fine mesh stainless steel screen was placed in the lower portion of the reactor to support the catalyst. The catalyst employed was activated carbon containing approximately 1% of cupric oxide. 40 grams of the catalyst was placed in the reactor tube. The reactor was fitted with an inlet for the mercaptan-air gaseous mixture at the lower end and with a condenser at the upper end through which the reaction products passed into a receiving vessel.

The catalyst was prepared by admixing at room temperature 200 grams of activated carbon having particle size of 50/150 mesh and supplied by the Barneby-Cheney Co. of Chicago, Illinois, under the designation UU-2, 32 grams of copper sulfate ($CuSO_4 \cdot 5H_2O$), 2 cc. of m-cresol and 600 cc. of water. After about 1 hour of continued stirring, 200 cc. of an 8% aqueous sodium hydroxide solution was added into the mixture and the stirring continued for half an hour. Thereafter the mixture was allowed to settle; the solid portion was separated, washed thoroughly with water and dried at 105° C. for about 16 hours.

Upon feeding the mercaptan-oxygen mixture through the reactor, the catalyst expanded from the original height of 7 inches to a bed height of 8.5 inches. The resulting fluidized bed was maintained in the reaction zone at the temperature of 198° C. After a 3-hour period of operating to reach steady conditions, there was produced 210 grams per hour of dimethyl disulfide together with a small proportion of water. This represented a 96% yield, based on the theoretical, or a 100% yield of dimethyl disulfide based on the mercaptan consumption, indicating no side reactions.

Dimethyl disulfide thus produced had a boiling point (760 mm.) of 109.6° C., a density (20° C.) of 1.0625 grams/cc. and an index of refraction $n_D^{20} = 1.5259$.

EXAMPLE 2

In order to compare the effectiveness of different types of catalysts for the process of this invention, the procedure of Example 1 was repeated at a reaction temperature of 160° C. The activated carbon and the respective amounts of metal oxides were the same as in Example 1.

The following Table 1 shows the pertinent data obtained from the experiments:

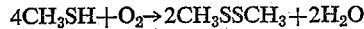

*Table 1*

| Catalyst Employed | Production Rate, lbs. Dimethyl Disulfide/lb. catalyst/hour |
|---|---|
| Activated carbon containing CuO | 5.2 |
| Activated carbon containing $Fe_2O_3$ | 3.6 |
| Activated carbon | 0.6 |
| CuO supported on activated bauxite | 0.2 |
| Activated bauxite | 0.05 |

The above results indicate the remarkable activity of the two catalysts containing activated carbon having deposited thereon either copper oxide or iron oxide when employed in the process of this invention, as compared to three other types of catalysts listed hereinabove.

EXAMPLE 3

The procedure employed in Example 1 was repeated, maintaining the temperature during the oxidation at 120° C. The yield of dimethyl disulfide was 95% based on the theoretical, or a 100% yield based on the mercaptan consumption.

EXAMPLE 4

The procedure of Example 1 was repeated with the reaction temperature maintained at 220° C. and using activated carbon catalyst containing 0.5% by weight of ferric oxide. The catalyst was prepared in substantially the same manner as described in Example 1 with ferric chloride having been used for deposition of the oxide on the carbon. A yield of 97% of dimethyl disulfide, based on the theoretical, or a 99% yield based on the mercaptan consumption was obtained.

EXAMPLE 5

In a reactor consisting of a 4-foot high glass tube having ½ inch diameter and being steam jacketed, methyl mercaptan and air were fed into the bottom of the reactor at a rate of 200 cc. per minute of methyl mercaptan and 300 cc. per minute of air, corresponding to an excess of oxygen over the stoichiometric amount required for the reaction with the mercaptan. The gaseous mixture was passed through a fixed bed 37 inches high of a catalyst consisting of activated carbon, copper oxide, and m-cresol, prepared in substantially the same manner as described in Example 1. The oxidation reaction was conducted in the vapor phase. It will be understood that due to the exothermic character of the reaction, the temperature at the bottom portion of the catalyst bed was considerably higher than at the top portion of the catalyst. However the operational conditions were so adjusted that the temperature of the reaction mixture at the top portion of the reaction zone was maintained above the boiling point of the dimethyl disulfide-water mixture, namely at 102–110° C. The gaseous effluent from the catalyst zone was water-cooled to liquefy the dimethyl disulfide and the water vapor. Thereafter the dimethyl disulfide product was separated from the water layer. There was obtained a 93% yield of dimethyl disulfide, based on the theoretical, or a 100% yield, based on the mercaptan consumption.

EXAMPLE 6

The procedure of Example 5 was repeated except that the catalyst was activated carbon on which iron oxide was deposited in the manner described in Example 4. A 91% conversion of methyl mercaptan to dimethyl disulfide, based on the theoretical, was obtained, or a 100% yield of dimethyl disulfide based on the methyl mercaptan consumed.

EXAMPLE 7

This example illustrates the effect of various types of catalysts on the yield of dimethyl disulfide based on the theoretical, using the same apparatus and the reaction conditions described in Example 5.

The catalysts of this invention consisting of activated carbon containing cupric oxide and ferric oxide were prepared by the procedure of Example 1. The activated carbon catalyst mixed with CuO was prepared by merely admixing together the same activated carbon and powdered CuO in the same respective amounts as employed for the catalyst of this invention. All other catalysts containing CuO were prepared in the manner described in Example 1 but employing different supports as shown.

The results obtained are shown in Table 2 hereinbelow.

*Table 2*

| Catalyst Employed | Percent Yield Dimethyl Disulfide |
|---|---|
| 1. Activated carbon containing CuO | 93 |
| 2. Activated carbon containing $Fe_2O_3$ | 91 |
| 3. Activated carbon mixed with CuO | 26 |
| 4. Activated carbon | 14 |
| 5. Activated carbon containing m-cresol | 14 |
| 6. CuO on activated alumina support | 30 |
| 7. CuO on silica gel support | 56 |
| 8. CuO on pumice support | Trace |

The above results indicate superior selectivity and activity of the catalysts 1 and 2 of this invention when employed in the conversion of methyl mercaptan to dimethyl disulfide.

EXAMPLE 8

Methyl mercaptan and oxygen were reacted in the liquid phase in the presence of a catalyst consisting of 96% of activated carbon having a particle size of 4/10 mesh, manufactured by the Pittsburgh Coke and Chemical Co., Pittsburgh, Pennsylvania, 2% of copper oxide and 2% of phenol deposited on the carbon in the manner described in Example 1. A 12-inch fixed catalyst bed was positioned in a 1½ inch diameter vertical glass tube. The tube was steam-jacketed and fitted with an inlet for liquid input and an outlet for gaseous reaction products at the top portion of the tube, as well as an outlet for liquid output and an inlet for oxygen input at the bottom portion of the reactor. A 10% NaOH solution containing 50 grams (1.02 moles) of methyl mercaptan per liter was preheated to 95° C. and pumped at a rate of 500 cc. per minute into the tube containing the catalyst bed. The oxygen feed rate was adjusted to 1 liter per minute. The reaction temperature was maintained slightly below the boiling point of the reaction mixture (approximately 97° C.). The reactor was run for about 2 hours at which time the catalyst was saturated with the reaction product, i.e. dimethyl disulfide. Thereafter, the feed of the mercaptan-containing solution and oxygen was continued and dimethyl disulfide distilled off as formed together with water vapor. After the reaction products were condensed and collected in the receiving vessel, water was separated from the dimethyl disulfide product. The yield obtained was 97% of dimethyl disulfide based on the methyl mercaptan consumed.

EXAMPLE 9

The procedure described in Example 8 was repeated, except that the catalyst employed consisted of 98% of activated carbon and 2% of cupric oxide. The catalyst was prepared in the manner substantially the same as described in Example 1.

Substantially identical yield of dimethyl disulfide as in Example 8 was obtained.

The above examples clearly illustrate that by employing the present invention, it is possible to obtain dimethyl disulfide in a very high yield by oxidation of lower alkyl mercaptans in the presence of a highly selective and active catalyst consisting essentially of activated carbon intimately associated with either copper oxide or iron oxide. Although the process is preferably carried out in the vapor phase employing a fluidized catalyst, the principles thereof also may be applied with a fixed catalyst in either vapor or liquid phase.

The end product of this invention, namely dimethyl disulfide, is useful or potentially useful in many applications, for example as a solvent for sulfur, as a soil sterilant, and as an intermediate raw material for the manufacture of more complex organic sulfur compounds such as dimethyl trisulfide, perchloromethyl mercaptan and others.

Having described my invention, I claim:

1. A process for the preparation of dialkyl disulfides which comprises heating and reacting a lower alkyl mercaptan having from 1 to 3 carbon atoms with a free oxygen-containing gas in the presence of a catalyst composed of activated carbon containing an oxide of a metal selected from the group consisting of copper and iron for a period of time sufficient to effect a substantially complete conversion of the mercaptan to the corresponding disulfide, and recovering the disulfide from the reaction mixture, said catalyst having been prepared by treating activated carbon with a solution of a salt of said metal and thereafter converting said salt to the oxide of said metal, said oxide being intimately combined with the activated carbon.

2. The process of claim 1 wherein the lower alkyl mercaptan comprises methyl mercaptan.

3. The process of claim 1 wherein the oxygen-containing gas is oxygen.

4. The process of claim 1 wherein the oxygen-containing gas is air.

5. The process of claim 1 wherein the carbon catalyst contains up to about 20% by weight of said oxide.

6. The process of claim 1 wherein the carbon catalyst contains from about 0.1% to 5% by weight of said oxide.

7. The process of claim 1 wherein the activated carbon catalyst contains copper oxide.

8. The process of claim 1 wherein the activated carbon catalyst contains iron oxide.

9. The process of claim 1 wherein the reaction is carried out in the liquid phase at a temperature between about 90° C. and the boiling point of the reaction mixture.

10. The process of claim 1 wherein the reaction is carried out in the vapor phase at a temperature above the boiling point of the reaction products mixture but below about 250° C.

11. The process of claim 10 wherein the temperature is between 150° C. and 220° C.

12. The process of claim 1 wherein the mercaptan and the oxygen in the oxygen-containing gas are fed into the reaction zone in approximately stoichiometric amounts required for the reaction.

13. The process of claim 1 wherein the catalyst includes a promoter consisting essentially of a monohydric phenol in an amount of up to 5% by weight based on the weight of the activated carbon.

14. The process of claim 13 wherein the amount of the promoter is from 0.1 to 2% by weight.

15. The process of claim 13 wherein the promoter comprises a cresol.

16. The process for the preparation of dimethyl disulfide which comprises reacting in the liquid phase an aqueous alkaline solution of methyl mercaptan with a free oxygen-containing gas at a temperature between about 90° C. and the boiling point of the reaction mixture in the presence of a catalyst composed of activated carbon containing copper oxide for a period of time sufficient to effect a substantially complete conversion of the mercaptan to dimethyl disulfide, and recovering dimethyl disulfide from the reaction mixture, said catalyst having been prepared by treating the activated carbon with a solution of a copper salt and thereafter converting said salt to copper oxide, said oxide being intimately combined with the activated carbon.

17. The process for the preparation of dimethyl disulfide which comprises reacting in the vapor phase methyl mercaptan with a free oxygen-containing gas at a temperature above the boiling point of the reaction products mixture but below about 250° C. in the presence of a catalyst composed of activated carbon containing an oxide of a metal selected from the group consisting of copper and iron for a period of time sufficient to effect a substantially complete conversion of a mercaptan to dimethyl disulfide, and recovering dimethyl disulfide from the reaction mixture, said catalyst having been prepared by treating the activated carbon with a solution of a salt of said metal and thereafter converting said salt to the oxide of said metal, said oxide being intimately combined with the activated carbon.

18. The process of claim 17 wherein the temperature is between 150° C. and 220° C.

19. The process of claim 1 wherein the conversion of said salt of said metal is effectuated by reacting said salt with an aqueous solution of an alkali metal hydroxide to form the hydroxide of the corresponding metal and heating said metal hydroxide until the oxide of said metal is produced.

20. The process of claim 1 wherein the salt of said metal is thermally unstable and the conversion of said salt of said metal is effectuated by heating said salt of said metal until the oxide of said metal is produced.

References Cited in the file of this patent

UNITED STATES PATENTS

| | | |
|---|---|---|
| 2,028,303 | Turner | Jan. 26, 1936 |
| 2,066,189 | Seaman et al. | Dec. 29, 1936 |
| 2,152,724 | Yabroff et al. | Apr. 4, 1939 |
| 2,574,844 | Mertz et al. | Nov. 13, 1951 |